March 2, 1954  W. E. ROOD, JR., ET AL  2,670,584
COTTON GLEANER

Filed March 24, 1952  2 Sheets-Sheet 1

INVENTORS
William E. Rood, Jr. and
Cecil M. Colvin,
BY
Scott L. Norvell
Attorney Patented Mar. 2, 1954

2,670,584

UNITED STATES PATENT OFFICE 2,670,584

COTTON GLEANER

William E. Rood, Jr., Phoenix, and Cecil M. Colvin, Maricopa County, Ariz.

Application March 24, 1952, Serial No. 278,144

11 Claims. (Cl. 56—28)

This invention concerns a "down" cotton gleaner and has for its principal purpose the gathering of cotton from the ground after it has been knocked down from the cotton plant stalks.

"Down" cotton is considered to be cotton which has been knocked or thrown down from the stalks and has already been considered a loss. With the advent of mechanical pickers the amount of cotton knocked down from the stalks to the ground has increased greatly. In addition to this, wherever the stalks dry prematurely, either by the action of chemicals or caterpillars, the cotton remaining on the stalk is very easily dislodged and knocked to the ground. This may happen not only from the action of pickers but because of high winds, rain, or other weather conditions.

Attempts have heretofore been made to retrieve this cotton and devices including vacuum apparatus, brushes, and the like, have been used but no great success has been attained. A principal objection has been that so much dirt was included in the cotton recovered that it was down-graded at the gin to a price such that the amount received did not pay for the cost of recovery.

In view of the foregoing, we have developed a cotton gleaner, or gatherer, which will pick up "down" cotton from the ground and include therewith very little dirt, and will perform this operation rapidly and automatically.

Another object of our invention is to provide a device which will select and gather cotton from the ground and reject dirt, sticks, portions of leaves and the like that may be on the ground in the vicinity of the cotton.

Still another object is to provide a device which includes a transversely slotted belt which will run over ground on which cotton has fallen and gather the cotton by the closing action of slots formed in said belt and will transport it to receiving hopper, and at the same time will not grasp or retain dirt, dried leaves, or the like which may be on the ground with or adjacent to the cotton.

Other objectives will appear hereinafter.

We attain the foregoing objective by means of the devices, construction, and combination of parts illustrated in the accompanying drawings, in which.

Similar numerals refer to similar parts in the several views.

Figure 1:
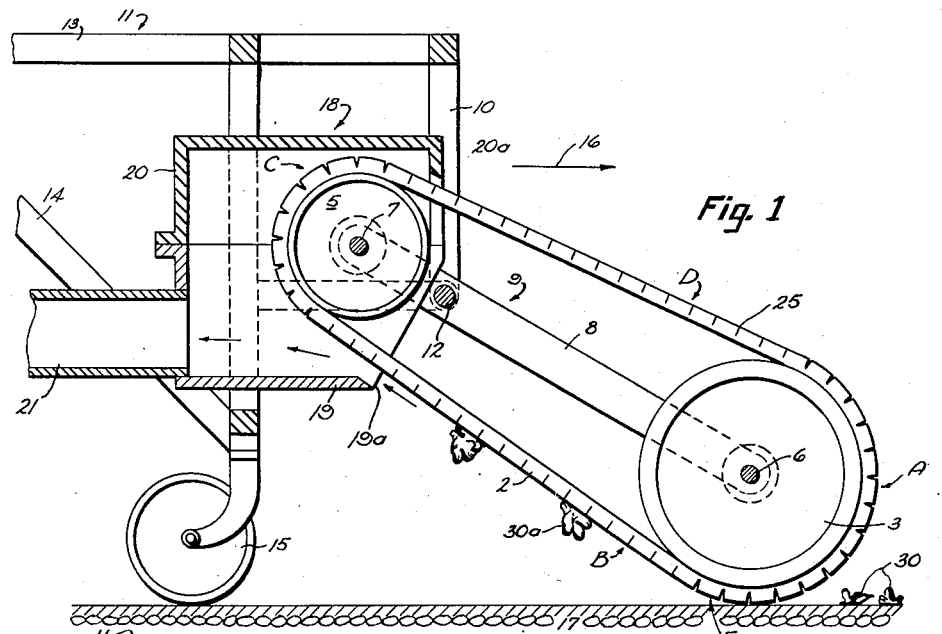
Figure 1 is a side elevation of one form of a cotton gleaner incorporating our improvements with certain parts sectioned off substantially on line 1—1, Figure 2.

In the drawings numeral 2 indicates the cotton gathering belt which runs over a forwardly position riding pulley wheel 3 and a rearwardly position, elevated, releasing pulley wheel 5. These pulley wheels are journalled to turn freely on shafts 6 and 7, respectively, which are supported in spaced relation by bars 8 which together with shafts 6 and 7 and other connecting parts constitute a pulley supporting member generally indicated by numeral 9. The pulley supporting member is, in turn, supported by bracket 10 which is a part of main supporting frame 11. A pin 12 extends transversely through the rear portion of bars 8 and bracket members 10 to afford a pivotal means of support for the supporting member 9 on the main frame 11. Frame 11 is intended to be attached to a suitable traction vehicle (not shown), and frame members 13 and 14 are attached to this vehicle by suitable clamps and fastenings. In addition to this means of support a caster wheel 15 may be attached to frame 11 and disposed so that it will run over the ground to the rear of belt 2 and afford support. The traction vehicle may be any tractor or vehicle which may be driven, drawn or pushed through a cotton field, between the stalks or between rows of stalks.

As shown in Figure 1, the gatherer is intended to move from left to right in the direction indicated by arrow 16. Pulley wheel 3 may then be considered at the forward end of belt 2 and pulley 5 at its rear end. Since the forward end of member 9 which includes bars 8 is heavier than its rear end from the point of pivotal support on pin 12, pulley 3 together with the forward portion of belt 2 will contact and roll over the surface of the earth, indicated by numeral 17. The rear portion of the belt is elevated somewhat above the forward portion and is surrounded by hooded hopper 18. The lower portion 19 of this hopper extends around the upper lower portion of belt 2 and partially embraces the sides of pulley wheel 5. The upper or hooded portion 20 covers the upper portion of belt 2, the upper portion of pulley wheel 5 and the rearwardly extending portion of the lower part of the hopper. These two hopper parts are provided with abutting flanges which are secured together with bolts or other suitable means. Belt 2 enters hopper 18 through a slot 19a, and leaves through a slot 20a. The hopper portion 19 is provided with a suction duct 21 which is connected to the intake of a suitable blower situated on a traction vehicle, and a draft of air is drawn through the hopper and out through this duct sufficient to convey any cotton gathered and released in the hopper to any desired receiver.

Belt 2 is preferably endless and is made of rubber or other similar suitable pliant material and may consist of several layers or can be made entirely of one layer. It has sufficient thickness so that there is a substantially thick inner layer 23 which contacts and runs on the annular surfaces of pulley wheels 3 and 5 and supports the outer portion. Outward from layer 23 there is an outer portion or layer 24 of substantial thickness. This outer layer is transversely cut at intervals throughout its perimeter as indicated by numerals 25. Portions of the outer face of the belt between the cuts, indicated by numerals 26, constitute what may be termed "pads."

Figure 4:
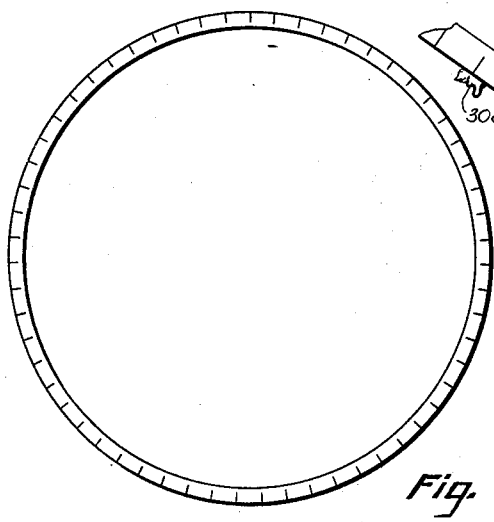
Figure 4 is an elevational view of the gathering belt as it appears in the process of formation.

In its preferred form the belt is molded to have a circular shape, as shown in Figure 4, and the cuts made, as indicated while in this shape. These are preferably cut or slit with a knife and no material is removed. They are not formed as grooves or slots. This procedure provides the endless belt 2, as above described, with cuts 25 disposed so that when the belt runs over the annular face of the pulley wheel 3 the forward portion of this belt is curved to form what we term the forward bend, A. This bend opens the cuts 25 so that their sides are forced apart forming V-shaped grooves. As the belt travels from this pulley wheel to the rear there is a straight portion B which we term the lower lay. In this portion the cuts are closed and their sides brought together. Since the lower lay is straight, and since the cuts were formed when the belt was in a circular shape, the sides of the cuts, when closed by the straightening of the belt are under compression. That is, the material of the pads 26 on each side of each cut 25 is in slight excess when the belt is straight. The sides of each cut are therefore forced closely together while the belt traverses the lower lay B.

As the belt travels over the rearward portion upper, or releasing pulley 5 the cuts are again opened and any cotton caught by them is released to hopper 18. We term this portion of the belt the releasing bend C.

The straight portion of the belt between the releasing bend C and the forward bend A is termed the upper lay, and is indicated by letter D.

Figure 3:
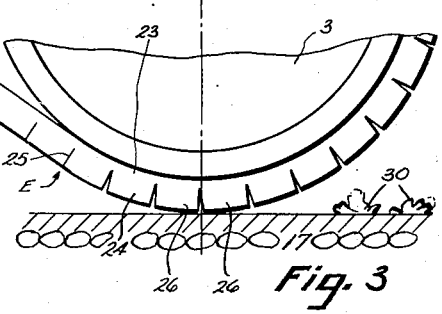
Figure 3 is an enlarged side elevation of a fragment of the gathering belt used on the gleaner, together with a portion of the riding pulley wheel over which it runs, drawn on a somewhat enlarged scale.

Operation of the above described gathering unit is as follows:

Cotton tufts, or wads, 30 lying on the surface of the earth 17 will be contacted by the outer surface of belt 2 as it rolls clockwise and moves forward in the direction of arrow 16. As the under face of the belt contacts any one of these tufts of cotton it compresses it and forces it slightly into the ground. Pads 26 provide the contacting surface which supports the forward portion of the belt, pulley wheel 3 and the forward portion of supporting number 9 while the cuts 25 are opened. The closing portion of the belt is indicated by letter E, Figures 1 and 3. It will be noticed that throughout position A the cuts 25 on the outer face of belt 2 are open because the belt is arcuate and because it is supported on the annular surface of riding pulley 3. Due to the nature of the cotton some portion of its fibers will extend upward into the opened cut or cuts of belt under which it is pressed. As the belt frame moves slightly forward its underside moves slightly to the rear relative to the supporting frame and as the belt leaves pulley 3 and enters lower lay B the cuts close at position E and grasp any or all fibers of the cotton which may have been included within the opened cut. The loose fibers of the cotton tufts are thus grasped between the pads 26 of the belt and the tufts of the cotton thus grasped, and indicated by numeral 30a, are carried upwardly and rearwardly into hopper 18 where they are released by the opening of the cuts as the belt passes over the rear bend C. The cotton thus released is then drawn by air suction through the duct 21.

Pads 26 when they roll over the ground press any upwardly extending particles of trash, leaves, or the like downward into the ground. Since such trash particles do not have appending fibers such as the cotton tufts have they do not enter the opened cuts. On the contrary, most of the particles or dirt, trash, leaves and the like are merely rolled into the ground as the belt passes over them and are rejected by the action of the belt at the same time that the cotton tufts are selected, gathered, and transported by the belt into the hopper.

While we have stated that the belt may be made of rubber or other similar pliant material, it is understood that it may be made with steel wires embedded in its inner portion 24 to prevent an undue amount of stretching. It is also conceivable that the inner portion of the belt may be made of hinged links.

Pulleys 3 and 5 may be made with their annular surfaces crowned somewhat so that the belt will not run off either side. Optionally the pulley faces may be provided with edge flanges to retain the belt in place.

Figure 2:
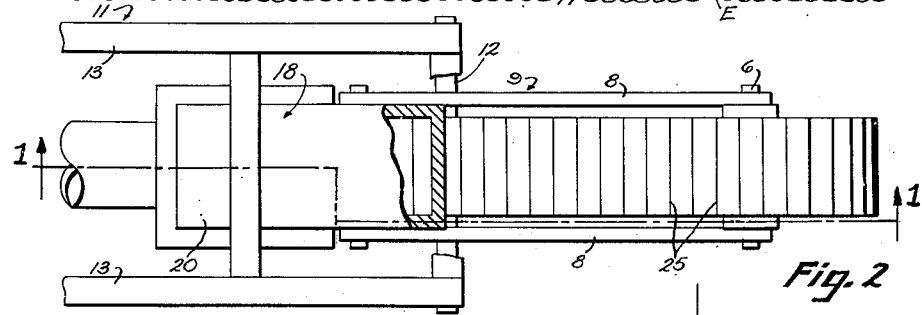
Figure 2 is a plan view thereof.
Figure 5:
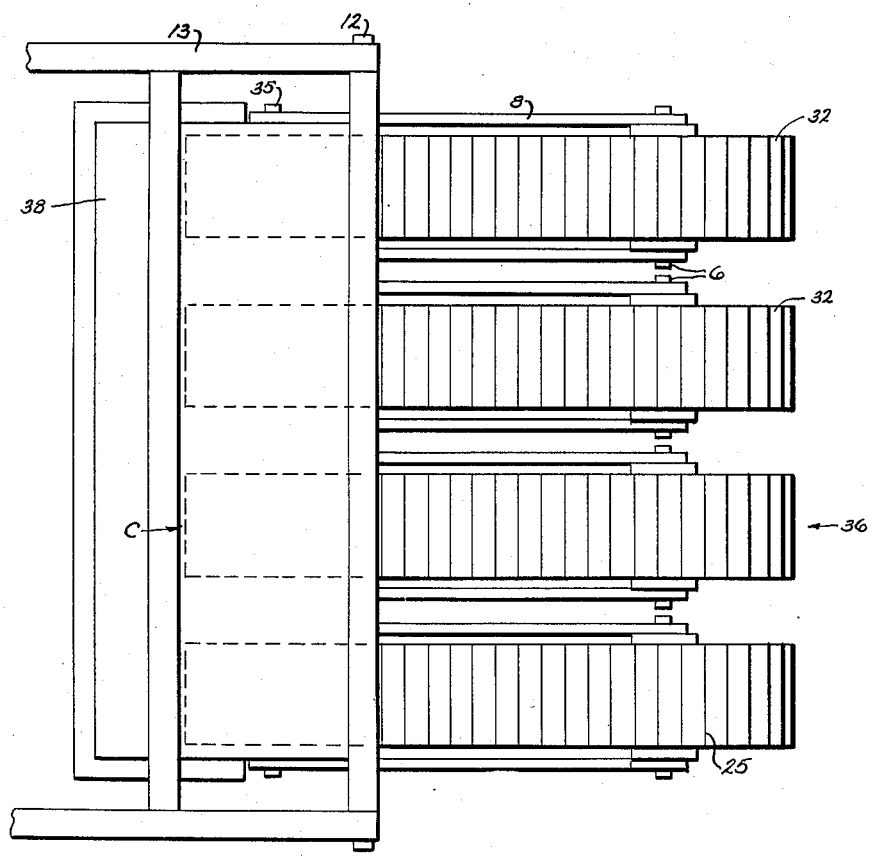
Figure 5 is a plan view of a gang of gatherers, such as shown in Figures 1 and 2, which are adapted to traverse the ground between rows of cotton stalks.

The above described gatherer unit will gather all "down" cotton within the limits of the surface of the belt as it contacts the ground. It is conceivable that a belt might be made as wide as the spaces between planted rows of cotton stalks. However, since the ground is always somewhat uneven we provide a more practical adaption of the device as shown in Figure 5. Here there is a gang 36 of gathering units indicated by numerals 32, supported on a common shaft 35 in the same manner as the first unit above described. These units are all independently pivotally supported. Shaft 35 is connected to a framework similar to that shown in Figures 1 and 2 and the releasing upper bend C of the belt of each of the units deposits gathered cotton into a common hopper 38, from which the cotton is removed by suction as above described.

While we have stated that the cotton is removed from hopper 18 by air suction it is to be understood that this cotton may be removed by any other desired means. Also, whereas we have described the invention as being used principally for the gathering of "down" cotton from the ground, it is also to be understood that the same principle of operation may be used to gather cotton from cotton stalks. In such an event the belts run edgewise relative to the ground and the pulleys over which they run are driven by mechanical means. The action of the cuts in the belt in grasping and releasing tufts of cotton, however, will be the same.

In view of the foregoing, and other variations which may suggest themselves to others familiar with the art, we wish to be limited only by the following claims:

We claim:

1. A cotton gleaner composed of a frame, adapted for attachment to a tractive vehicle, arranged to traverse the ground between cotton plants, with a forward operating movement; a pulley supporting member pivotally attached at its rear to said frame with its forward portion extending ahead of said pivotal attachment; a riding pulley journalled on a shaft on the forward portion of said supporting member; a releasing pulley journalled on a shaft in the upper rear portion of said supporting member; a gathering belt of pliant material running over said pulleys having transverse shallow cuts in its outer face; means disposed adjacent the releasing pulley to receive cotton released from the belt as said belt runs over the releasing pulley.

2. A cotton gleaner composed of a frame, adapted for attachment to a tractive vehicle, arranged to traverse the ground between cotton plants, with a forward operating movement; a pulley supporting member pivotally attached at its rear to said frame with its forward portion extending ahead of said pivotal attachment; a riding pulley journalled on a shaft on the forward portion of said supporting member; a releasing pulley journalled on a shaft in the upper rear portion of said supporting member; a gathering belt of pliant material running over said pulleys having transverse shallow cuts in its outer face extending partially through its thickness; a hopper, having a hood, enclosing the upper portion of said belt which runs over said releasing pulley, and an air suction duct connected to said hopper to remove cotton released therein; said gathering belt being supported on said pulleys so that its lower bend, which runs over said riding pulley, will contact and roll over the ground from which cotton is to be gleaned so that the belt runs over said pulley, while the transverse cuts on its outer face open as the belt bends over said riding pulley and close as they enter the lower lay of the belt pinching the fibers of any cotton contacted on said ground by the belt, and open again as the belt bends over said releasing pulley.

3. In a cotton gleaner of the type disclosed, a riding pulley wheel and a releasing pulley wheel journalled in spaced relation to each other on a supporting member; a pivotal support for said supporting member on a frame disposed so that said riding pulley wheel normally maintains a lowered position relative to said releasing pulley wheel; a cotton gathering belt having a plurality of transverse cuts on its outer face running over and between said pulleys; means disposed adjacent the releasing pulley to receive cotton released from the belt as said belt runs over the releasing pulley; mechanism for propelling said frame over the earth from which cotton is to be gleaned so that said riding pulley wheel advances ahead of said releasing pulley wheel; said pulley wheels being vertically disposed on said supporting member so that the under portion of the belt running over said riding pulley wheel will traverse the surface of said earth to be gleaned and said releasing pulley wheel will operate at a position somewhat elevated relative to said riding pulley wheel so that the portion of said belt running over said releasing pulley will be above the portion running over said riding pulley in contact with the earth.

4. In a cotton gleaner of the type disclosed, a pulley wheel supporting member pivotally supported on a supporting and propelling main frame; a riding pulley wheel and releasing pulley wheel journalled on shafts disposed in spaced relation on said supporting member; a gathering belt running over and between said pulley wheels, having transverse cuts in its outer face which open as the belt bends over said pulleys and close as the belt runs in straight lays between said pulley wheels; means disposed adjacent the releasing pulley to receive cotton released from the belt as said belt runs over the releasing pulley; said pulley wheels being disposed so that said main frame will advance said riding wheel over ground to be gleaned with the under part of the bend of said belt which runs thereover in contact with the surface of said ground and with the bend of said belt which runs over said releasing pulley following and disposed in a relatively elevated position.

5. In a cotton gleaner of the type disclosed, a pulley wheel supporting member pivotally supported on a supporting and propelling main frame; a riding pulley wheel and releasing pulley wheel journalled on shafts disposed in spaced relation on said supporting member; a gathering belt running over and between said pulley wheels, having transverse cuts in its outer face which open as the belt bends over said pulleys and close as the belt runs in straight lays between said pulley wheels; means disposed adjacent the releasing pulley to receive cotton released from the belt as said belt runs over the releasing pulley.

6. In a cotton gleaner of the type disclosed, having a riding pulley wheel and a releasing pulley wheel disposed in spaced relation on a supporting frame; a gleaner belt of pliant material to run over said pulleys having an inner portion to contact and run on the annular faces of said pulley wheels; an outer portion thereon having transverse cuts providing supporting pads therebetween, said cuts forming V-shaped grooves when said belt bends over the surfaces of said pulley wheels and closing when said belt runs in straight lays between said pulley wheels.

7. In a cotton gleaner of the type disclosed, having a riding pulley wheel and a releasing pulley wheel disposed in spaced relation on a supporting frame; a gleaner belt of pliant material to run over said pulleys having an inner portion to contact and run on the annular faces of said pulley wheels; an outer portion molded thereon having transverse cuts providing supporting pads therebetween, formed when said inner portion is maintained in a circular shape; said cuts forming V-shaped grooves when said belt bends over the surfaces of said pulley wheels and closing when said belt runs in straight lays between said pulley wheels; said cuts being made in said outer belt portion when it is molded in circular shape on said inner portion so that, when portions thereof run in straight lays between said pulley wheels the walls of said cuts are brought forcefully into contact because of the excess of material in said pads.

8. In a device of the type described, a supporting frame including parallel supporting bars; an opening pulley wheel journalled at one end of said supporting bars; a releasing pulley wheel journalled at the opposite end of said supporting bars; a main frame pivotally attached to said supporting frame; and a gleaner belt running over said pulleys having an inner portion in contact with and supported on the annular faces of said pulley wheels and an outer portion composed of pads interspersed with transverse cuts; said cuts forming V-shaped grooves when said belt bends over the surfaces of said pulley wheels and closing when said belt runs between said pulley wheels.

9. In a cotton gleaner of the type disclosed, having a riding pulley wheel and a releasing pulley wheel disposed in spaced relation on a supporting frame; a gleaner belt of pliant material running over said pulleys having an inner portion running on the annular faces of said pulley wheels; an outer portion molded thereon having transverse cuts providing supporting pads therebetween, formed when said inner portion is maintained in a circular shape; said cuts forming V-shaped grooves when said belt bends over the surfaces of said pulley wheels and closing when said belt runs in straight lays between said pulley wheels; said cuts being made in said outer belt portion when it is in circular shape so that, when portions thereof run in straight lays between said pulley wheels the walls of said cuts are compressed tightly into contact.

10. A cotton gleaner for gathering tufts of cotton from the ground composed of a frame, adapted for attachment to a tractive vehicle, arranged to traverse the ground between cotton plants, with a forward operating movement; a pulley supporting frame member pivotally attached at its rear to said tractor frame with its forward portion extending ahead of said pivotal attachment; a riding pulley journalled on a shaft on the forward portion of said supporting frame member; a releasing pulley journalled on a shaft in the upper rear portion of said supporting frame member; a gathering belt of pliant material running over said pulleys having transverse shallow cuts in its outer face extending partially through its thickness; a hopper, having a hood, enclosing the upper portion of said belt which runs over said releasing pulley, and an air suction duct connected to said hopper removing cotton released from said belt; said gathering belt being supported on said pulleys so that its lower bend, which runs over said riding pulley, contacts and rolls over the ground from which cotton is to be gleaned and so that as the belt runs over said pulley, said transverse cuts on its outer face open and close as they enter the lower lay of the belt pinching the fibers of any cotton contacted on said ground by the belt, and carry said cotton to said hopper and open again as the belt bends over said releasing pulley, depositing said cotton in said hopper.

11. A cotton gleaner comprising a frame adapted to be attached to mobile means for transport between rows of cotton plants, a plurality of pulleys rotatably supported on said frame and in spaced relationship, a pliant belt running over and between the several pulleys, the belt having a plurality of cuts in its outer surface adapted to open up as the belt passes around each pulley and to close as the belt runs in straight lays between the pulleys, one of said pulleys projecting below the frame and adapted to engage the belt with the ground whereby transport of the frame induces rotation of said pulley, and cotton collecting means disposed adjacent a different one of said pulleys.

WILLIAM E. ROOD, Jr.
CECIL M. COLVIN.

References Cited in the file of this patent

UNITED STATES PATENTS

| Number | Name | Date |
|---|---|---|
| 606,476 | Schenson | June 28, 1898 |
| 843,294 | O'Shaughnessy | Feb. 5, 1907 |
| 1,737,708 | Johnston et al. | Sept. 10, 1927 |
| 2,297,295 | Flintjer | Sept. 29, 1942 |